(12) United States Patent
Ichikawa

(10) Patent No.: US 9,917,478 B2
(45) Date of Patent: Mar. 13, 2018

(54) POWER TRANSMISSION DEVICE, POWER RECEPTION DEVICE AND POWER TRANSFER SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 656 days.

(21) Appl. No.: 14/358,658

(22) PCT Filed: Nov. 18, 2011

(86) PCT No.: PCT/JP2011/076662
§ 371 (c)(1),
(2), (4) Date: May 15, 2014

(87) PCT Pub. No.: WO2013/073051
PCT Pub. Date: May 23, 2013

(65) Prior Publication Data
US 2015/0001957 A1     Jan. 1, 2015

(51) Int. Cl.
*H01F 27/42* (2006.01)
*H01F 37/00* (2006.01)
*H01F 38/00* (2006.01)
*H02J 50/12* (2016.01)
*H02J 50/70* (2016.01)
(Continued)

(52) U.S. Cl.
CPC ............ *H02J 50/12* (2016.02); *B60L 11/182* (2013.01); *H01F 27/36* (2013.01); *H01F 38/14* (2013.01); *H02J 5/005* (2013.01); *H02J 7/025* (2013.01); *H02J 17/00* (2013.01); *H02J 50/70* (2016.02); *Y02T 10/7005* (2013.01);
(Continued)

(58) Field of Classification Search
CPC .. H02J 5/005; H02J 50/70; H02J 50/12; H02J 7/025; B60L 11/182; B60L 11/1829; H01F 27/36; H01F 27/362; H01F 27/365; H01F 27/367; H01F 38/14; Y02T 90/122; Y02T 90/14
See application file for complete search history.

(56) References Cited

U.S. PATENT DOCUMENTS 5,821,728 A * 10/1998 Schwind ............... B60L 11/182
                                                            320/108
7,741,734 B2   6/2010 Joannopoulos et al.
(Continued)

FOREIGN PATENT DOCUMENTS

AU      2006269374 B2    1/2007
AU      2006269374 C1    1/2007
(Continued)

*Primary Examiner* — Rexford Barnie
*Assistant Examiner* — Rasem Mourad
(74) *Attorney, Agent, or Firm* — Oliff PLC

(57) ABSTRACT

A power transmission device includes a power transmission unit transmitting electric power in a contactless manner to a power reception unit provided outside; and a power transmission-side shield formed in a hollow shape and provided so as to surround the power transmission unit. An electromagnetic wave can pass through a region on a side opposite to a region where the power reception unit is located across the power transmission-side shield. The power transmission-side shield is provided with a shield member on a side opposite to the power transmission unit across the power transmission-side shield.

18 Claims, 11 Drawing Sheets

(51) Int. Cl.
  *H01F 27/36*    (2006.01)
  *H01F 38/14*    (2006.01)
  *B60L 11/18*    (2006.01)
  *H02J 7/02*     (2016.01)
  *H02J 5/00*     (2016.01)
  *H02J 17/00*    (2006.01)

(52) U.S. Cl.
  CPC .......... *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0058358 A1 | 3/2009 | Inoue et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0065352 A1* | 3/2010 | Ichikawa ............ B60L 11/182 180/65.8 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0176904 A1* | 7/2010 | Ibuki .................... G01R 15/142 336/174 |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1* | 9/2010 | Oyobe ................ B60L 5/005 320/108 |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0254376 A1* | 10/2011 | Sasaki ................. B60L 5/005 307/104 |
| 2012/0161696 A1* | 6/2012 | Cook ................... B60L 11/182 320/108 |
| 2012/0169131 A1* | 7/2012 | Choudhary ............ H02J 5/005 307/104 |
| 2012/0242447 A1* | 9/2012 | Ichikawa ............. B60L 11/182 336/84 C |
| 2012/0312196 A1* | 12/2012 | Newkirk ................ H02J 7/025 108/23 |
| 2012/0326522 A1* | 12/2012 | Fukushima ............ H02J 5/005 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102656648 A | 9/2012 |
| EP | 1 902 505 A2 | 3/2008 |
| EP | 2 130 287 A1 | 12/2009 |
| EP | 2701283 A1 | 2/2014 |
| IN | 735/DELNP/2008 | 5/2008 |
| IN | 6195/DELNP/2009 | 7/2010 |
| JP | A-11-041712 | 2/1999 |
| JP | A-2008-294385 | 12/2008 |
| JP | A-2009-004512 | 1/2009 |
| JP | A-2009-501510 | 1/2009 |
| JP | A-2009-076513 | 4/2009 |
| JP | A-2010-070048 | 4/2010 |
| JP | A-2010-252583 | 11/2010 |
| JP | A-2011-072188 | 4/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2011/074091 A1 | 6/2011 |

* cited by examiner

POWER TRANSMISSION DEVICE, POWER RECEPTION DEVICE AND POWER TRANSFER SYSTEM

TECHNICAL FIELD

The present invention relates to a power transmission device, a power reception device and a power transfer system.

BACKGROUND ART

In consideration of the environment, attention has recently been given to a hybrid vehicle, an electric vehicle and the like that use electric power from a battery and the like to drive driving wheels.

Particularly in recent years, attention also has been given to wireless charging, by which the above-mentioned battery mounted in an electrically powered vehicle can be charged in a contactless manner without using a plug and the like. Furthermore, various types of charging schemes are also recently proposed as a contactless charging scheme.

The power transfer system using a contactless charging scheme is disclosed, for example, in Japanese Patent Laying-Open No. 2010-070048 (PTD 1), Japanese Patent Laying-Open No. 2010-252583 (PTD 2), Japanese Patent Laying-Open No. 2008-294385 (PTD 3), Japanese Patent Laying-Open No. 2009-004512 (PTD 4), and Japanese Patent Laying-Open No. 2009-076513 (PTD 5).

In these power transfer systems, a power transmission device and a power reception device each are configured to have a surface facing the other device through which electromagnetic waves can pass, and to have the other surfaces not facing the other device that are covered by a shield member. For example, a contactless power feeding system disclosed in PTD 1 employs a shield box having a cubic shape and configured to have a surface facing the other device so as to allow electromagnetic waves to pass therethrough, and to have other five surfaces each provided with a shield member so as to reflect the electromagnetic waves (near field).

The shield box should be sized such that a power feeding unit (a power transmission unit) and the shield member housed within the shield box are arranged at a certain distance or more from each other. Consequently, it is feared that the power feeding unit (power transmission unit) may be increased in size, particularly, increased in height.

CITATION LIST

Patent Document

PTD 1: Japanese Patent Laying-Open No. 2010-070048
PTD 2: Japanese Patent Laying-Open No. 2010-252583
PTD 3: Japanese Patent Laying-Open No. 2008-294385
PTD 4: Japanese Patent Laying-Open No. 2009-004512
PTD 5: Japanese Patent Laying-Open No. 2009-076513

SUMMARY OF INVENTION

Technical Problem

Therefore, the present invention has been made to solve the above-described problems. An object of the present invention is to provide a power transmission device, a power reception device and a power transfer system, providing a structure that can prevent an increase in size of the power transmission device.

Solution to Problem

A power transmission device based on the present invention includes a power transmission unit transmitting electric power in a contactless manner to a power reception unit provided outside; and a power transmission-side shield formed in a hollow shape and provided so as to surround the power transmission unit. An electromagnetic wave is capable of passing through a region on a side opposite to a region where the power reception unit is located across the power transmission-side shield. The power transmission-side shield is provided with a shield member on a side opposite to the power transmission unit across the power transmission-side shield.

According to another embodiment, the shield member is electrically connected to the power transmission-side shield.

According to another embodiment, the shield member is electrically connected to an end of the power transmission-side shield on a side opposite to the region where the power reception unit is located.

According to another embodiment, a difference between a natural frequency of the power transmission unit and a natural frequency of the power reception unit is equal to or less than 10% of the natural frequency of the power reception unit.

According to another embodiment, a coupling coefficient between the power reception unit and the power transmission unit is equal to or less than 0.1.

According to another embodiment, the power transmission unit transmits electric power to the power reception unit through at least one of a magnetic field formed between the power reception unit and the power transmission unit and oscillating at a specific frequency, and an electric field formed between the power reception unit and the power transmission unit and oscillating at a specific frequency.

In an aspect of a power transfer system according to the present invention, a power transfer system is provided that includes a power transmission device including a power transmission unit and a power reception device including a power reception unit receiving electric power from the power transmission unit in a contactless manner. The power transmission device includes a power transmission-side shield formed in a hollow shape and provided so as to surround the power transmission unit. The power transmission device is configured such that an electromagnetic wave is capable of passing through a region on a side opposite to a region where the power reception unit is located across the power transmission-side shield, and the power transmission-side shield is provided with a shield member on a side opposite to the power transmission unit across the power transmission-side shield.

According to another embodiment, the shield member is electrically connected to the power transmission-side shield.

According to another embodiment, the shield member is electrically connected to an end of the power transmission-side shield on a side opposite to the region where the power reception unit is located.

A power reception device according to the present invention includes a power reception unit receiving electric power in a contactless manner from a power transmission unit provided outside; and a power reception-side shield formed in a hollow shape and provided so as to surround the power reception unit. An electromagnetic wave is capable of passing through a region on a side opposite to a region where the power reception unit is located across the power reception-side shield. The power reception-side shield is provided with a shield member on a side opposite to the power reception unit across the power reception-side shield.

According to another embodiment, the shield member is electrically connected to the power reception-side shield.

According to another embodiment, the shield member is electrically connected to an end of the power reception-side shield on a side opposite to the region where the power transmission unit is located.

According to another embodiment, a difference between a natural frequency of the power transmission unit and a natural frequency of the power reception unit is equal to or less than 10% of the natural frequency of the power reception unit.

According to another embodiment, a coupling coefficient between the power reception unit and the power transmission unit is equal to or less than 0.1.

According to another embodiment, the power reception unit receives electric power from the power transmission unit through at least one of a magnetic field formed between the power reception unit and the power transmission unit and oscillating at a specific frequency, and an electric field formed between the power reception unit and the power transmission unit and oscillating at a specific frequency.

In another aspect of a power transfer system according to the present invention, a power transfer system is provided that includes a power transmission device including a power transmission unit, and a power reception device including a power reception unit receiving electric power from the power transmission unit in a contactless manner. The power reception device includes a power reception-side shield formed in a hollow shape and provided so as to surround the power reception unit. The power reception device is configured such that an electromagnetic wave is capable of passing through a region on a side opposite to a region where the power transmission unit is located across the power reception-side shield, and the power reception-side shield is provided with a shield member on a side opposite to the power reception unit across the power reception-side shield.

According to another embodiment, the shield member is electrically connected to the power reception-side shield.

According to another embodiment, the shield member is electrically connected to an end of the power reception-side shield on a side opposite to the region where the power transmission unit is located.

Advantageous Effects of Invention

According to the present invention, it becomes possible to provide a power transmission device, a power reception device and a power transfer system, providing a structure that can prevent an increase in size of the power transmission device.

DESCRIPTION OF EMBODIMENTS

Figure 1:
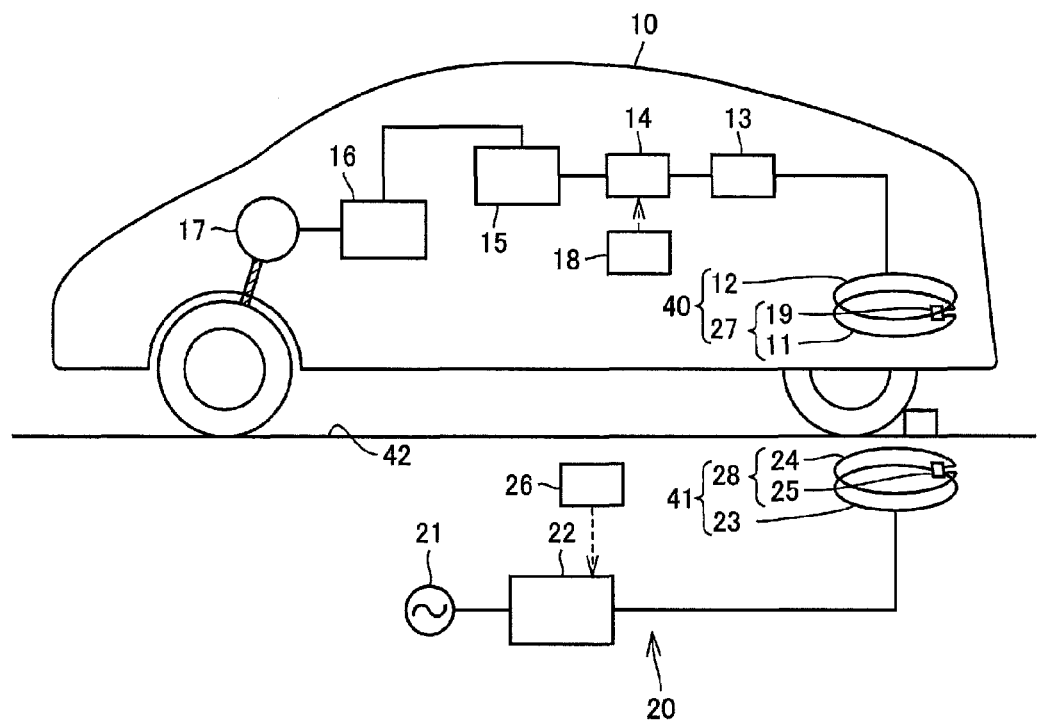
FIG. 1 is a diagram schematically illustrating a power transmission device, a power reception device and a power transfer system according to an embodiment.

A power transmission device, a power reception device and a power transfer system according to the embodiments based on the present invention will be hereinafter described with reference to the accompanying drawings. In each embodiment described below, when the number, the quantity and the like are mentioned, the scope of the present invention is not necessarily limited thereto unless otherwise specified. The same or corresponding components are designated by the same reference characters, and the same description may not be repeated. It is originally intended to use configurations in the embodiments appropriately combined together.

(Embodiments)

Referring to FIG. 1, a power transfer system according to the present embodiment will be hereinafter described. FIG. 1 is a diagram schematically illustrating a power transmission device, a power reception device and a power transfer system according to the embodiment.

The power transfer system according to the present first embodiment includes an electrically powered vehicle 10 having a power reception device 40, and an external power feeding device 20 having a power transmission device 41. The power reception device of electrically powered vehicle 10 receives electric power mainly from power transmission device 41 in the state where the vehicle is stopped in a prescribed position of a parking space 42 provided with power transmission device 41.

In parking space 42, there are provided with a wheel block and a line showing a position and a range where a vehicle should be stopped, in order to allow electrically powered vehicle 10 to be stopped in a prescribed position.

External power feeding device 20 includes a high-frequency power driver 22 connected to an alternating-current (AC) power supply 21, a control unit 26 controlling driving of high-frequency power driver 22 and the like, and power transmission device 41 connected to this high-frequency power driver 22. Power transmission device 41 includes a power transmission unit 28 and an electromagnetic induction coil 23. Power transmission unit 28 includes a resonant coil 24 and a capacitor 25 connected to resonant coil 24. Electromagnetic induction coil 23 is electrically connected to high-frequency power driver 22. Although capacitor 25 is provided in the example shown in this FIG. 1, it is not an indispensable component.

Power transmission unit 28 includes an electric circuit formed of an inductance of resonant coil 24, and a stray capacitance of resonant coil 24 and a capacitance of capacitor 25.

Electrically powered vehicle 10 includes a power reception device 40, a rectifier 13 connected to power reception device 40, a DC/DC converter 14 connected to this rectifier 13, a battery 15 connected to this DC/DC converter 14, a power control unit (PCU) 16, a motor unit 17 connected to this power control unit 16, and a vehicle ECU (Electronic Control Unit) 18 controlling driving of DC/DC converter 14, power control unit 16 and the like. In addition, electrically powered vehicle 10 according to the present embodiment is a hybrid vehicle including an engine that is not shown, but may be an electric vehicle or a fuel cell vehicle as long as it is driven by a motor.

Rectifier 13 is connected to electromagnetic induction coil 12, and converts the alternating current supplied from electromagnetic induction coil 12 into a direct current, and supplies the current to DC/DC converter 14.

DC/DC converter 14 adjusts the direct-current (DC) voltage supplied from rectifier 13 and supplies the adjusted voltage to battery 15. It is to be noted that DC/DC converter 14 is not an indispensable component but may be omitted. In this case, a matching device for matching the impedance to external power feeding device 20 is provided between power transmission device 41 and high-frequency power driver 22, so that DC/DC converter 14 can be substituted with this matching device.

Power control unit 16 includes a converter connected to battery 15 and an inverter connected to this converter. The converter adjusts (boosts) the direct current supplied from battery 15 and supplies this current to the inverter. The inverter converts the direct current supplied from the converter into an alternating current and supplies this current to motor unit 17.

Motor unit 17 may be, for example, a three-phase AC motor and the like, and is driven by the alternating current supplied from the inverter of power control unit 16.

In the case where electrically powered vehicle 10 is a hybrid vehicle, electrically powered vehicle 10 further includes an engine. Motor unit 17 includes a motor generator mainly functioning as a power generator and a motor generator mainly functioning as an electric motor.

Power reception device 40 includes a power reception unit 27 and an electromagnetic induction coil 12. Power reception unit 27 includes a resonant coil 11 and a capacitor 19. Resonant coil 11 has a stray capacitance. Accordingly, power reception unit 27 includes an electric circuit formed of an inductance of resonant coil 11 and capacitances of resonant coil 11 and capacitor 19. It is to be noted that capacitor 19 is not an indispensable component, but can be omitted.

In the power transfer system according to the present embodiment, the difference between the natural frequency of power transmission unit 28 and the natural frequency of power reception unit 27 is equal to or less than 10% of the natural frequency of power reception unit 27 or power transmission unit 28. By setting the natural frequencies of power transmission unit 28 and power reception unit 27 to fall within such a range, the power transfer efficiency can be enhanced. On the other hand, when the difference between the natural frequencies is greater than 10% of the natural frequency of power reception unit 27 or power transmission unit 28, the power transfer efficiency becomes less than 10%, which leads to an adverse effect such as an increase in time for charging battery 15.

In this case, when capacitor 25 is not provided, the natural frequency of power transmission unit 28 represents an oscillation frequency occurring when the electric circuit formed of the inductance of resonant coil 24 and the capacitance of resonant coil 24 freely oscillates. When capacitor 25 is provided, the natural frequency of power transmission unit 28 represents an oscillation frequency occurring when the electric circuit formed of the capacitances of resonant coil 24 and capacitor 25 and the inductance of resonant coil 24 freely oscillates. In the above-described electric circuit, the natural frequency occurring when the braking force and the electric resistance are set at zero or at substantially zero is also referred to as a resonance frequency of power transmission unit 28.

Similarly, when capacitor 19 is not provided, the natural frequency of power reception unit 27 represents an oscillation frequency occurring when the electric circuit formed of the inductance of resonant coil 11 and the capacitance of resonant coil 11 freely oscillates. When capacitor 19 is provided, the natural frequency of power reception unit 27 represents an oscillation frequency occurring when the electric circuit formed of the capacitances of resonant coil 11 and capacitor 19 and the inductance of resonant coil 11 freely oscillates. In the above-described electric circuit, the natural frequency occurring when the braking force and the electric resistance are set at zero or at substantially zero is also referred to as a resonance frequency of power reception unit 27.

Figure 2:
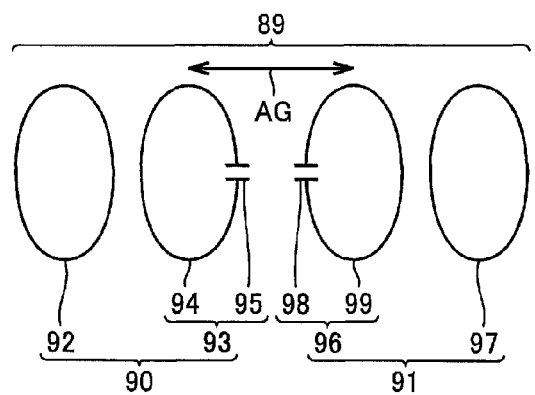
FIG. 2 is a diagram showing a simulation model of the power transfer system.
Figure 3:
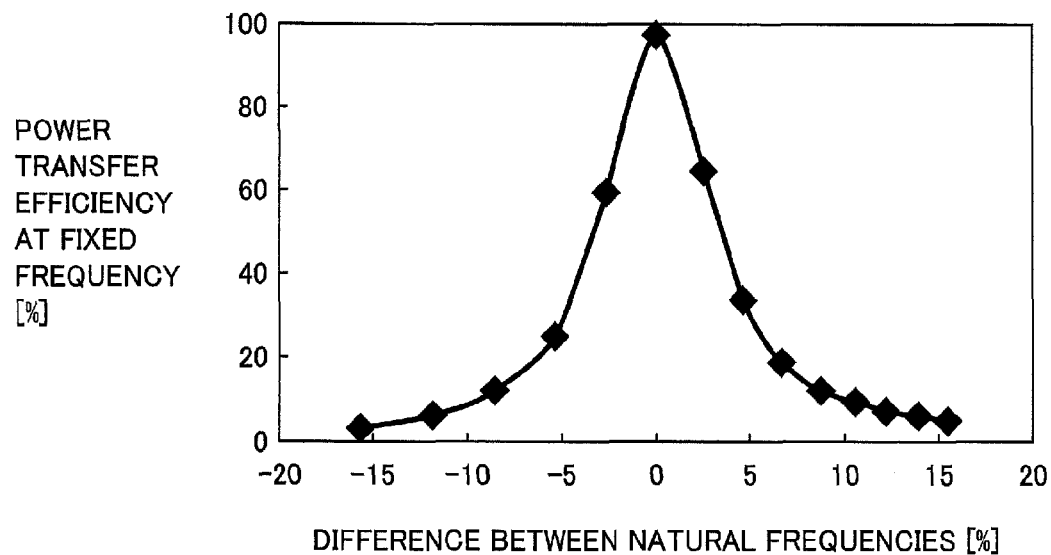
FIG. 3 is a diagram showing a simulation result.

Referring to FIGS. 2 and 3, the simulation results of analyzing the relation between the power transfer efficiency and the difference between the natural frequencies will be hereinafter described. FIG. 2 shows a simulation model of the power transfer system. A power transfer system 89 includes a power transmission device 90 and a power reception device 91. Power transmission device 90 includes an electromagnetic induction coil 92 and a power transmission unit 93. Power transmission unit 93 includes a resonant coil 94 and a capacitor 95 provided in resonant coil 94.

Power reception device 91 includes a power reception unit 96 and an electromagnetic induction coil 97. Power reception unit 96 includes a resonant coil 99 and a capacitor 98 connected to this resonant coil 99.

The inductance of resonant coil 94 is defined as an inductance Lt, and the capacitance of capacitor 95 is defined as a capacitance C1. The inductance of resonant coil 99 is defined as an inductance Lr, and the capacitance of capacitor 98 is defined as a capacitance C2. When each parameter is set in this way, a natural frequency f1 of power transmission unit 93 is represented by the following equation (1), and a natural frequency f2 of power reception unit 96 is represented by the following equation (2).

$$f1 = 1/\{2\pi(Lt \times C1)^{1/2}\} \quad (1)$$

$$f2 = 1/\{2\pi(Lr \times C2)^{1/2}\} \quad (2)$$

FIG. 3 shows the relation between the power transfer efficiency and the difference between the natural frequencies of power transmission unit 93 and power reception unit 96 in the case where inductance Lr and capacitances C1 and C2 are fixed while only inductance Lt is changed. In this simulation, the relative positional relation between resonant coil 94 and resonant coil 99 is fixed, and also, the frequency of the current supplied to power transmission unit 93 is constant.

In the graph shown in FIG. 3, the horizontal axis shows the difference between natural frequencies (%) while the vertical axis shows the power transfer efficiency at a fixed frequency (%). The difference between the natural frequencies (%) is represented by the following equation (3).

$$\text{(Difference between natural frequencies)} = \{(f1-f2)/f2\} \times 100(\%) \quad (3)$$

As apparent also from FIG. 3, the power transfer efficiency is close to 100% when the difference between the natural frequencies (%) is ±0%. The power transfer efficiency reaches 40% when the difference between the natural frequencies (%) is ±5%. The power transfer efficiency reaches 10% when the difference between the natural frequencies (%) is ±10%. The power transfer efficiency reaches 5% when the difference between the natural frequencies (%) is ±15%. In other words, it can be found that the power transfer efficiency can be improved by setting the natural frequencies of the power transmission unit and the power reception unit such that the absolute value of the difference between natural frequencies (%) (the difference between natural frequencies) falls within a range equal to or less than 10% of the natural frequency of power reception unit 96. Furthermore, it can be found that the power transfer efficiency can be further improved by setting the natural frequencies of the power transmission unit and the power reception unit such that the absolute value of the difference between the natural frequencies (%) is equal to or less than 5% of the natural frequency of power reception unit 96. It is to be noted that electromagnetic field analysis software (JMAG (registered trademark): manufactured by JSOL Corporation) is employed as simulation software.

The operation of the power transfer system according to the present embodiment will be hereinafter described.

In FIG. 1, AC power is supplied from high-frequency power driver 22 to electromagnetic induction coil 23. When a prescribed alternating current flows into electromagnetic induction coil 23, the alternating current also flows into resonant coil 24 by electromagnetic induction. In this case, the electric power is supplied to electromagnetic induction coil 23 such that the frequency of the alternating current flowing through resonant coil 24 reaches a specific frequency.

When the current of a specific frequency flows into resonant coil 24, an electromagnetic field oscillating at a specific frequency is formed around resonant coil 24.

Resonant coil 11 is disposed within a prescribed range from resonant coil 24, and receives electric power from the electromagnetic field formed around resonant coil 24.

In the present embodiment, a so-called helical coil is employed for resonant coil 11 and resonant coil 24. Accordingly, a magnetic field oscillating at a specific frequency is mainly formed around resonant coil 24, and resonant coil 11 receives electric power from this magnetic field.

Hereinafter described will be the magnetic field of a specific frequency formed around resonant coil 24. The "magnetic field of a specific frequency" is typically related to the power transfer efficiency and the frequency of the current supplied to resonant coil 24. First described will be the relation between the power transfer efficiency and the frequency of the current supplied to resonant coil 24. The power transfer efficiency achieved when transmitting electric power from resonant coil 24 to resonant coil 11 varies depending on various factors such as a distance between resonant coil 24 and resonant coil 11. For example, the natural frequencies (resonance frequencies) of power transmission unit 28 and power reception unit 27 each are defined as a natural frequency f0; the frequency of the current supplied to resonant coil 24 is defined as a frequency f3; and the air gap between resonant coil 11 and resonant coil 24 is defined as an air gap AG.

Figure 4:
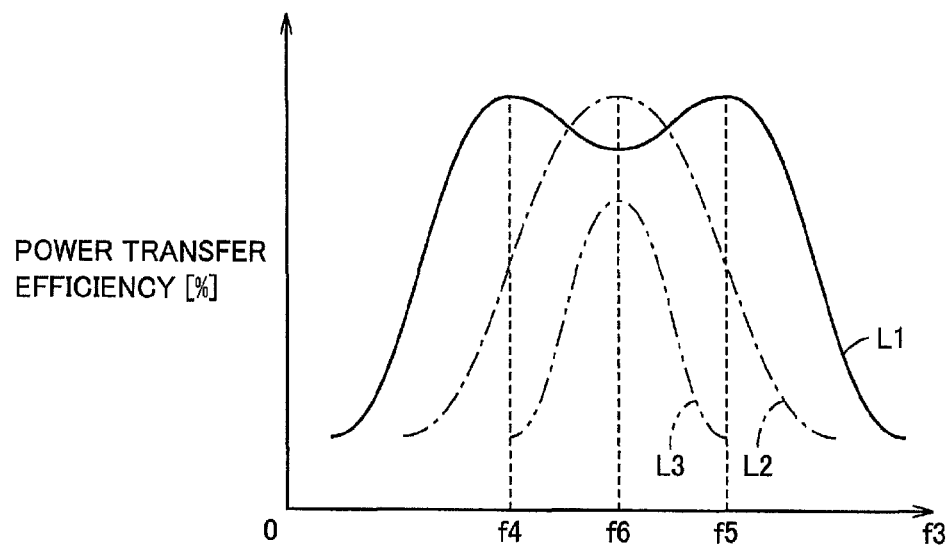
FIG. 4 is a diagram showing the relation between the power transfer efficiency achieved when an air gap is changed and a frequency f of the current supplied to a resonant coil, in the state where a natural frequency is fixed.

FIG. 4 is a graph showing the relation between the power transfer efficiency achieved when changing air gap AG and frequency f3 of the current supplied to resonant coil 24, in the state where natural frequency f0 is fixed.

In the graph shown in FIG. 4, the horizontal axis shows frequency f3 of the current supplied to resonant coil 24 while the vertical axis shows the power transfer efficiency (%). An efficiency curve L1 schematically shows the relation between the power transfer efficiency achieved when air gap AG is relatively small and frequency f3 of the current supplied to resonant coil 24. As shown in this efficiency curve L1, when air gap AG is relatively small, a peak of the power transfer efficiency occurs at frequencies f4 and f5 (f4<f5). When air gap AG is increased, two peaks occurring when the power transfer efficiency rises are changed so as to come close to each other. Then, as shown in an efficiency curve L2, when air gap AG is increased greater than a prescribed distance, the power transfer efficiency exhibits one peak. In this case, the peak of the power transfer efficiency occurs when the frequency of the current supplied to resonant coil 24 is at frequency f6. When air gap AG is further increased as compared with the state of efficiency curve L2, the peak of the power transfer efficiency becomes relatively lower as shown in an efficiency curve L3.

For example, the following first method can be conceivable as a method for improving the power transfer efficiency. The method conceivable as the first method is to change the capacitances of capacitor 25 and capacitor 19 while the frequency of the current supplied to resonant coil 24 shown in FIG. 1 is kept constant in accordance with air gap AG, thereby changing the characteristics of the power transfer efficiency between power transmission unit 28 and power reception unit 27. Specifically, the capacitances of capacitor 25 and capacitor 19 are adjusted such that the power transfer efficiency reaches a peak in the state where the frequency of the current supplied to resonant coil 24 is kept constant. According to this method, the frequency of the current flowing into resonant coil 24 and resonant coil 11 is constant irrespective of the size of air gap AG. In addition, the method of changing the characteristics of the power transfer efficiency can be a method utilizing a matching device provided between power transmission device 41 and high-frequency power driver 22, a method utilizing converter 14, and the like.

Furthermore, the second method is a method of adjusting the frequency of the current supplied to resonant coil 24 based on the size of air gap AG. For example, in FIG. 4, when the power transfer characteristics exhibit efficiency curve L1, a current at frequency f4 or frequency f5 is supplied to resonant coil 24. Then, when the frequency characteristics exhibit efficiency curves L2 and L3, the current at frequency f6 is supplied to resonant coil 24. In this case, the frequency of the current flowing into resonant coil 24 and resonant coil 11 is to be changed in accordance with the size of air gap AG.

According to the first method, the frequency of the current flowing through resonant coil 24 is a fixed constant frequency. According to the second method, the frequency flowing through resonant coil 24 is a frequency that changes as appropriate in accordance with air gap AG. The current of a specific frequency set by the first method, the second method or the like so as to raise the power transfer efficiency is supplied to resonant coil 24. When the current of a specific frequency flows into resonant coil 24, a magnetic field (electromagnetic field) oscillating at a specific frequency is formed around resonant coil 24. Power reception unit 27 receives electric power from power transmission unit 28 through a magnetic field formed between power reception unit 27 and power transmission unit 28 and oscillating at a specific frequency. Therefore, the "magnetic field oscillating at a specific frequency" is not necessarily a magnetic field of the fixed frequency. In the above-described example, the frequency of the current supplied to resonant coil 24 is set focusing attention on air gap AG. The power transfer efficiency however changes also depending on other factors such as a horizontal gap between resonant coil 24 and resonant coil 11, and the like. Thus, the frequency of the current supplied to resonant coil 24 may be adjusted based on these other factors.

In addition, an example employing a helical coil as a resonant coil has been described in the present embodiment. In contrast, when an antenna such as a meander line is employed as a resonant coil, the current of a specific frequency flows through resonant coil 24, thereby forming an electric field of a specific frequency around resonant coil 24. Then, electric power is transferred through this electric field between power transmission unit 28 and power reception unit 27.

Figure 5:
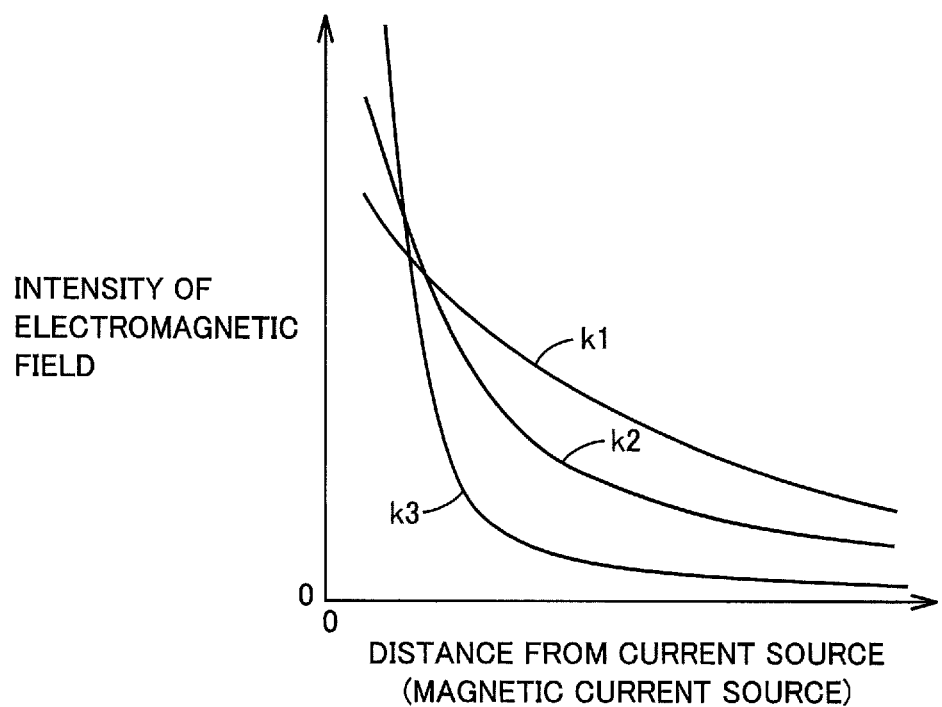
FIG. 5 is a diagram showing the relation between the distance from a current source (magnetic current source) and the intensity of an electromagnetic field.

In the power transfer system according to the present embodiment, the power transmission efficiency and the power reception efficiency are improved by utilizing a near field (evanescent field) where an "electrostatic field" of the electromagnetic field is dominant. FIG. 5 is a diagram showing the relation between the distance from a current source (magnetic current source) and the intensity of the electromagnetic field. Referring to FIG. 5, the electromagnetic field includes three components. A curve k1 represents a component inversely proportional to the distance from a wave source, and is referred to as a "radiation electric field". A curve k2 represents a component inversely proportional to the square of the distance from the wave source, and is referred to as an "induction electric field". A curve k3 represents a component inversely proportional to the cube of the distance from the wave source, and is referred to as an "electrostatic field". Assuming that the wavelength of the electromagnetic field is defined as "$\lambda$", the distance by which the intensities of the "radiation electric field", the "induction electric field" and the "electrostatic field" are approximately the same can be expressed as $\lambda/2\pi$.

The "electrostatic field" is a region where the intensity of the electromagnetic wave sharply decreases in accordance with the distance from the wave source. The power transfer system according to the present embodiment utilizes a near field (evanescent field) where this "electrostatic field" is dominant, to transfer energy (electric power). Specifically, in the near field where the "electrostatic field" is dominant, power transmission unit 28 and power reception unit 27 (for example, a pair of LC resonant coils) having natural frequencies close to each other are resonated, thereby transferring energy (electric power) from power transmission unit 28 to power reception unit 27 as the other component. This "electrostatic field" does not propagate energy to a distant location. Therefore, as compared with an electromagnetic wave transferring energy (electric power) by the "radiation electric field" propagating energy to a distant location, the resonance method allows electric power transmission with a relatively small energy loss.

In this way, in the power transfer system according to the present embodiment, power transmission unit 28 and power reception unit 27 are resonated by an electromagnetic field, thereby transferring electric power from power transmission device 41 to the power reception device. The coupling coefficient ($\kappa$) between power transmission unit 28 and power reception unit 27 is equal to or less than 0.1. According to power transfer utilizing electromagnetic induction, generally, the coupling coefficient ($\kappa$) between the power transmission unit and the power reception unit is close to 1.0.

Coupling between power transmission unit 28 and power reception unit 27 during power transfer in the present embodiment is for example referred to as "magnetic resonance coupling", "magnetic field resonance coupling", "electromagnetic field resonance coupling", or "electric field resonance coupling".

"Electromagnetic field resonance coupling" means coupling including each of "magnetic resonance coupling" "magnetic field resonance coupling" and "electric field resonance coupling".

A coil-shaped antenna is employed for resonant coil 24 of power transmission unit 28 and resonant coil 11 of power reception unit 27 that have been described in the present specification. Accordingly, power transmission unit 28 and power reception unit 27 are mainly coupled by a magnetic field, and are "magnetic resonance coupling" or "magnetic field resonance coupling" to each other.

In addition, for example, an antenna such as a meander line can also be employed as resonant coils 24 and 11, in which case power transmission unit 28 and power reception unit 27 are mainly coupled by an electric field. At this time, power transmission unit 28 and power reception unit 27 are "electric field resonance coupling" to each other.

(Power Transmission Device 41)

Figure 6:
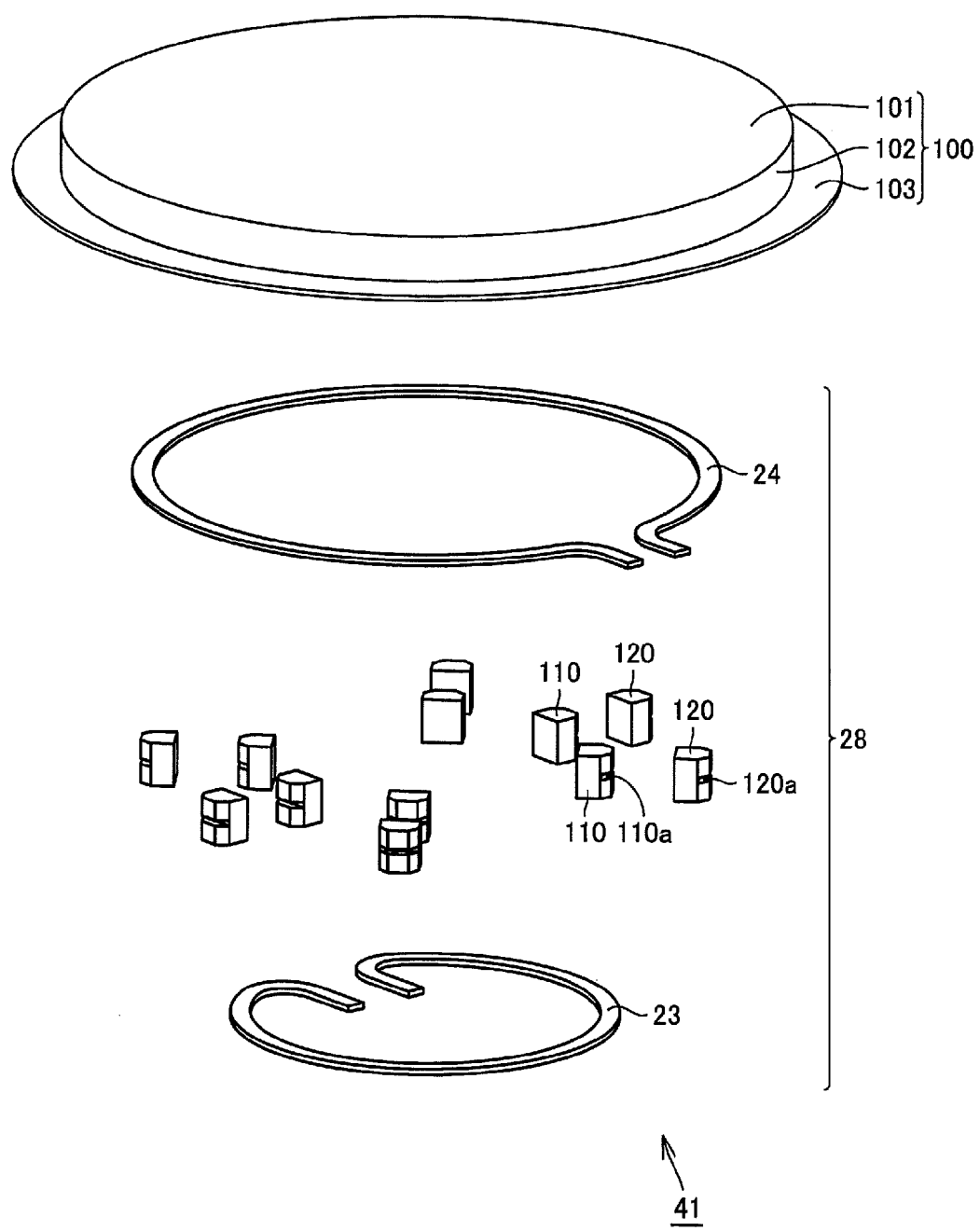
FIG. 6 is an exploded perspective view showing the structure of the power transmission device according to the embodiment.
Figure 7:
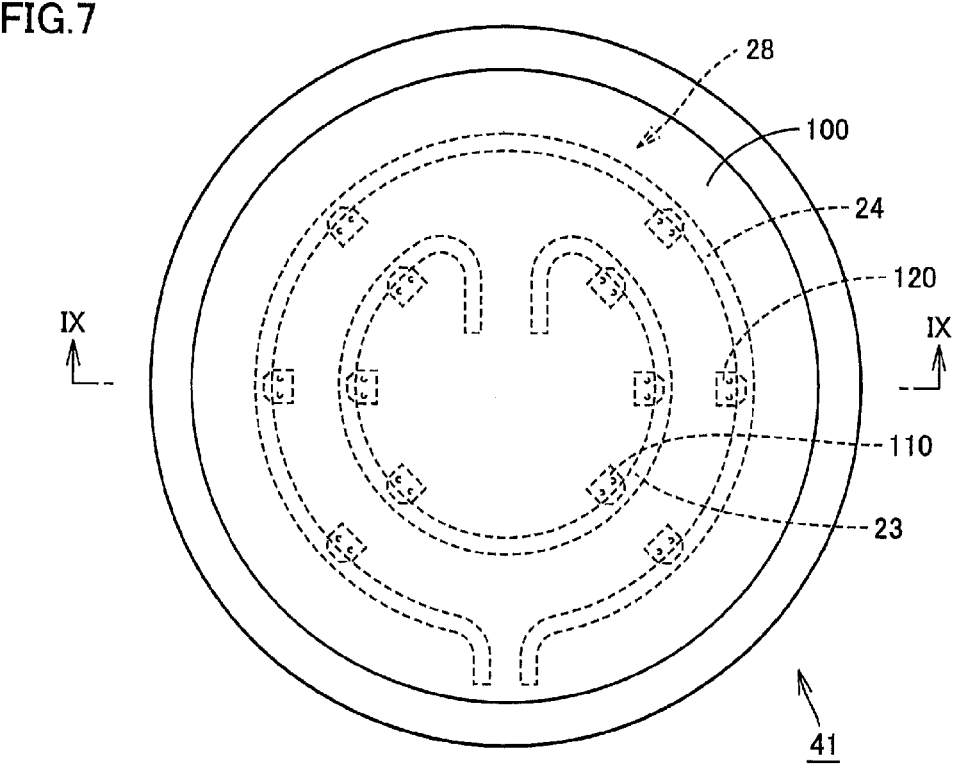
FIG. 7 is a plan view of the power transmission device according to the embodiment.
Figure 8:
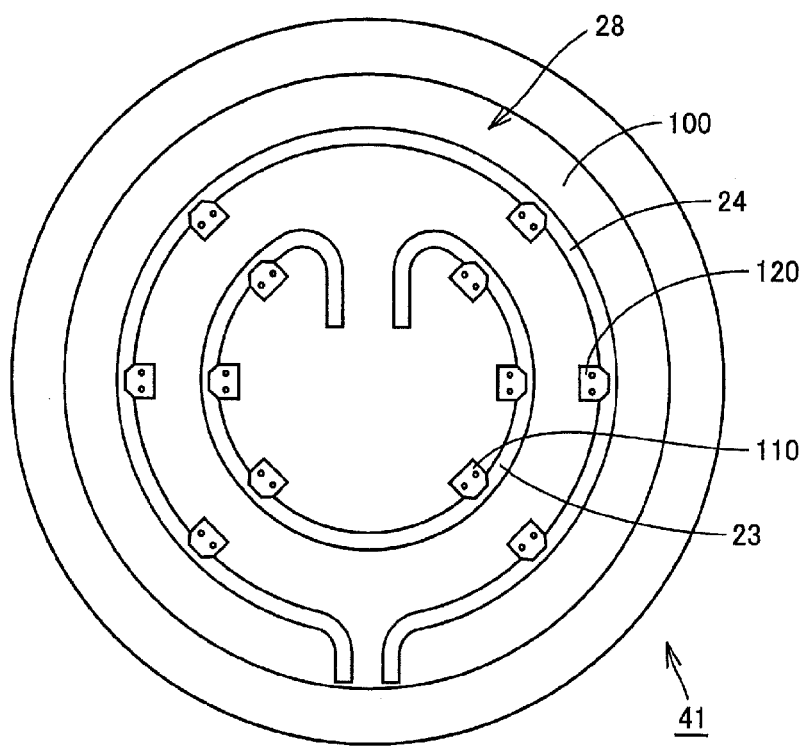
FIG. 8 is a bottom view of the power transmission device according to the embodiment.
Figure 9:
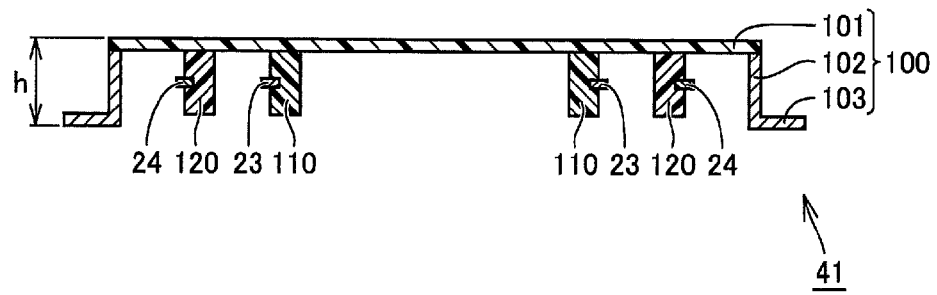
FIG. 9 is a cross-sectional view taken along a line IX-IX in FIG. 7.

Referring to FIGS. 6 to 9, a specific configuration of power transmission device 41 in the present embodiment will then be described. FIG. 6 is an exploded perspective view showing the structure of power transmission device 41; FIG. 7 is a plan view of power transmission device 41; FIG. 8 is a bottom view of power transmission device 41; and FIG. 9 is a cross-sectional view taken along the line IX-IX in FIG. 7.

Power transmission device 41 includes a circular electromagnetic induction coil 23 and a circular resonant coil 24 that form power transmission unit 28. On the radially outside of these electromagnetic induction coil 23 and resonant coil 24, a power transmission-side shield 102 in a cylindrical shape is provided so as to surround the outside of each of electromagnetic induction coil 23 and resonant coil 24. A shield member having an electromagnetic wave screening effect is used for this power transmission-side shield 102. For example, a metal material such as copper is used. Also, power transmission-side shield 102 may be formed of an inexpensive member having an inner surface or an outer surface onto which cloth, a sponge or the like having an electromagnetic wave shielding effect may be attached.

A cover 101 made of a resin is provided on the side of power transmission-side shield 102 facing power reception unit 27 (see FIG. 1, on the upper side in the figure). Cover 101 does not have an electromagnetic wave screening effect in the present embodiment. Electromagnetic waves can pass through a region on the side opposite to the region where power reception unit 27 is located (on the lower side in the figure) across power transmission-side shield 102.

Power transmission-side shield 102 is provided with a shield member 103 on the side opposite to power transmission unit 28 across power transmission-side shield 102. More specifically, power transmission-side shield 102 in a circular shape is provided on its outer circumferential surface side with shield member 103 extending outwardly in the radial direction. As with power transmission-side shield 102, this shield member 103 is also formed using a shield member having an electromagnetic wave screening effect. Shield member 103 in the present embodiment has an annular shape having a prescribed width in the radial direction. It is to be noted that shield member 103 is not limited to the above-described shape, but may be shaped as shown in FIGS. 17 to 20 described later.

Shield member 103 is electrically connected to the end of power transmission-side shield 102 on the side opposite to the region where power reception unit 27 is located. According to the present embodiment, power transmission-side shield 102 and shield member 103 are integrally formed by the same member.

In the present embodiment, cover 101, power transmission-side shield 102 and shield member 103 form a shield cover 100. Although it has been described in the present embodiment that cover 101 and power transmission-side shield 102 in a cylindrical shape are employed, the shapes of cover 101 and power transmission-side shield 102 are not limited to a circular shape, but can be a polygonal shape shown in FIGS. 18 and 19 described later, a rectangular shape, and other various shapes.

Electromagnetic induction coil 23 is supported by a coil support member 110 made of a resin and provided with a support groove 110a. Six coil support members 110 are used in the present embodiment. The inner circumferential surface of electromagnetic induction coil 23 is supported at six positions by coil support members 110. Each coil support member 110 is fixed to cover 101. The number of coil support members 110 to be used and the position where the coil should be supported are changed as appropriate depending on the size and the shape of the coil.

Resonant coil 24 is disposed on the radially outside of electromagnetic induction coil 23, and supported by coil support member 120 made of a resin and provided with a support groove 120a. Six coil support members 120 are used in the present embodiment. The inner circumferential surface of electromagnetic induction coil 23 is supported at six positions by coil support members 120. Each coil support member 120 is fixed to cover 101. The number of coil support members 120 to be used and the position where the coil should be supported are changed as appropriate depending on the size and the shape of the coil.

It is to be noted that the shapes and the arrangement of resonant coil 24 and electromagnetic induction coil 23 are not limited to those in the present embodiment. The arrangement relation between electromagnetic induction coil 23 and resonant coil 24 is not limited to the relation shown in the figure, but electromagnetic induction coil 23 and resonant coil 24 can be arranged so as to be stacked.

As shown in FIG. 9, electromagnetic induction coil 23 and resonant coil 24 are housed within an inner space defined by power transmission-side shield 102 of shield cover 100. According to the present embodiment, electromagnetic waves can pass through the region on the side opposite to the region where power reception unit 27 is located (on the lower side in the figure; which will be referred to as a "bottom side" in the present embodiment for the sake of convenience) across power transmission-side shield 102.

As described above, the present embodiment employs a configuration not including a shield on the bottom side. Accordingly, the height (h) of power transmission-side shield 102 only has to satisfy the height that allows electromagnetic induction coil 23 and resonant coil 24 to be housed within an inner space defined by power transmission-side shield 102 of shield cover 100. As a result, the height (h) of power transmission-side shield 102 can be decreased, so that power transmission device 41 can be prevented from being increased in the height direction.

Furthermore, when a shield is not provided on the bottom side, electromagnetic waves (near field) may leak from the bottom. However, power transmission-side shield 102 is provided at its outer circumferential surface side with shield member 103 extending outwardly, so that leakage of the electromagnetic waves (near field) to the outside of power transmission-side shield 102 can be suppressed using shield member 103.

Figure 10:
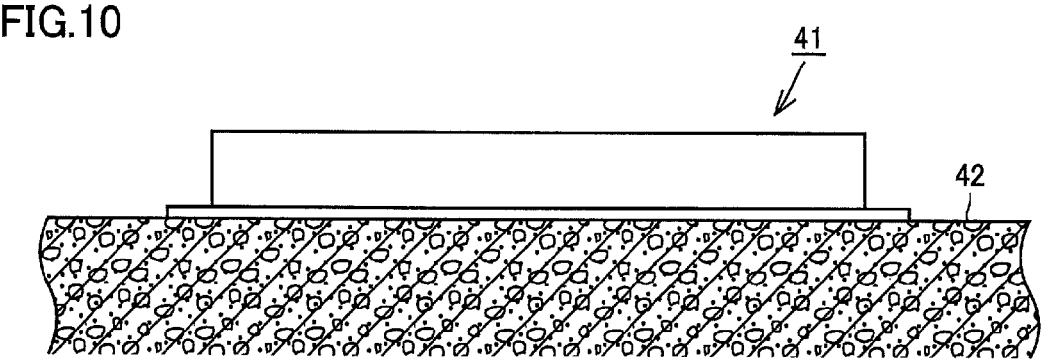
FIG. 10 is the first diagram showing the state where the power transmission device is placed in a parking space.
Figure 11:
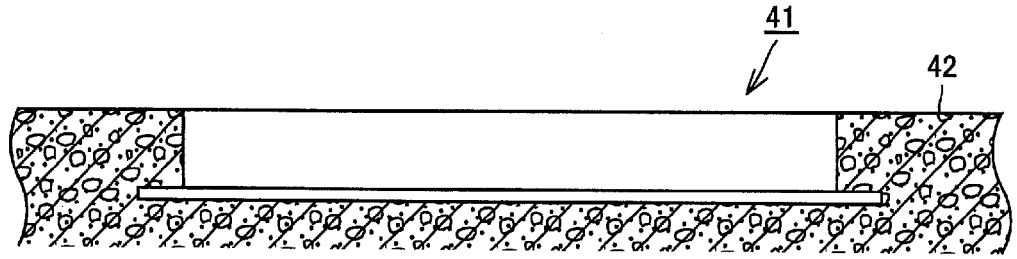
FIG. 11 is the second diagram showing the state where the power transmission device is placed in the parking space.

Referring to FIGS. 10 and 11, hereinafter described will be the case where power transmission device 41 having the above-described configuration is installed in parking space 42. FIGS. 10 and 11 are the first and second diagrams, respectively, showing the state where power transmission device 41 is placed in parking space 42.

FIG. 10 shows the state where the above-described power transmission device 41 is placed on parking space 42. This power transmission device 41 is relatively lower in the height direction. Accordingly, even when power transmission device 41 is placed on parking space 42, a protruding amount of power transmission device 41 can be suppressed.

Furthermore, as shown in FIG. 11, even when the above-described power transmission device 41 is buried in the underground beneath the surface of parking space 42, the depth of the hole for burying the device formed in the underground beneath the surface can be shallow, so that the effort for the installation operation can also be reduced.

(Other Embodiments)

Then, referring to FIGS. 12 to 15, power transmission devices 41A to 41D according to other embodiments will be hereinafter described. The configuration of each of power transmission devices 41A to 41D is basically the same as that of the above-described power transmission device 41, but different only in the form of shield member 103. Therefore, in the following explanation, the same configuration as that of power transmission device 41 will be denoted by the same reference characters and the same description will not be repeated, but the form of shield member 103 will be described in detail.

Figure 12:
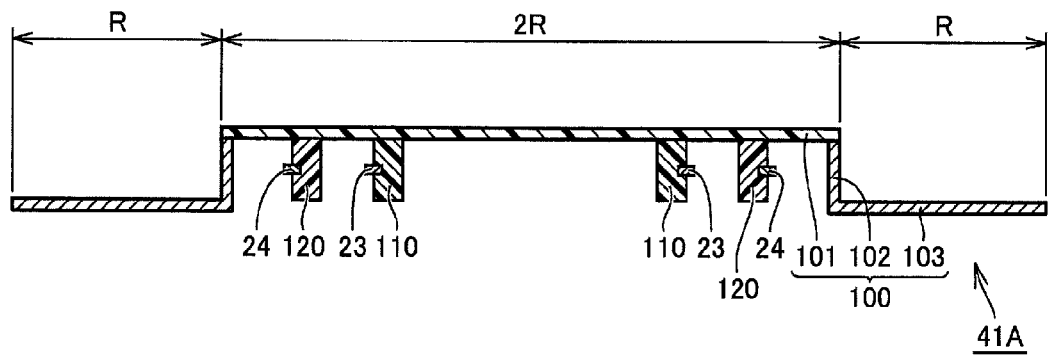
FIG. 12 is a cross-sectional view of a power transmission device according to another embodiment taken along the line IX-IX in FIG. 7.

Referring to FIG. 12, assuming that the diameter of cover 101 is 2 R, power transmission device 41A is configured to have shield member 103 having a protruding length R that is half (or more than half) of the diameter of this cover 101. This allows further improvement in the effect of suppressing leakage of electromagnetic waves to the radially outside of power transmission-side shield 102.

Figure 13:
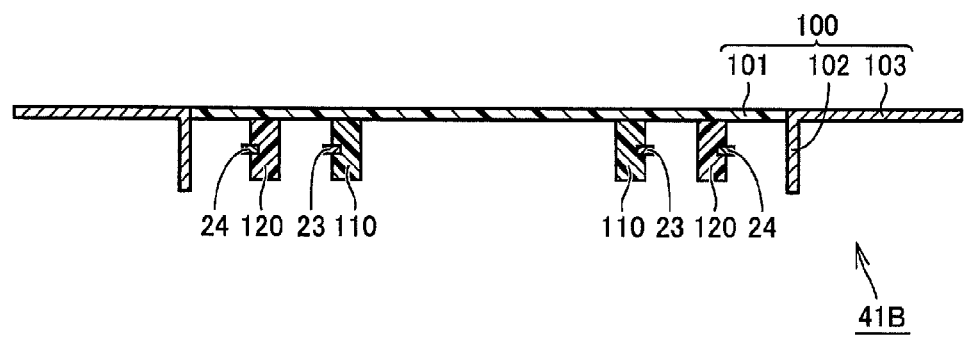
FIG. 13 is a cross-sectional view of a power transmission device according to still another embodiment taken along the line IX-IX in FIG. 7.

Referring to FIG. 13, this power transmission device 41B is provided with shield member 103 at the end of power transmission-side shield 102 on the side where power reception unit 27 is provided. This configuration can also achieve the functions and effects similar to those achieved in power transmission devices 41 and 41A.

Figure 14:
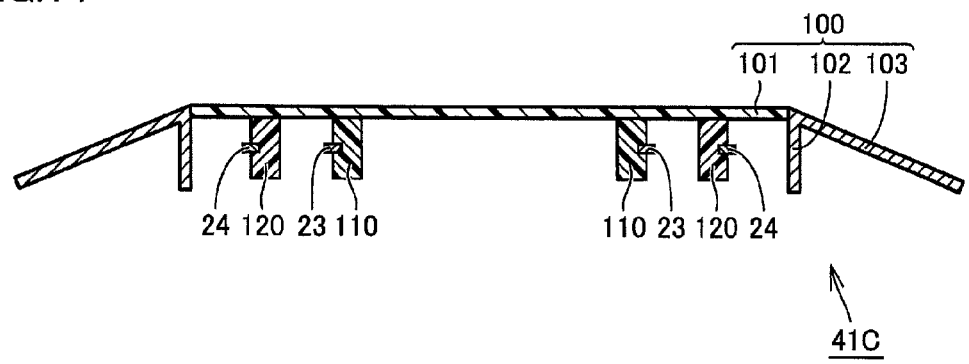
FIG. 14 is a cross-sectional view of a power transmission device according to still another embodiment taken along the line IX-IX in FIG. 7.

Referring to FIG. 14, this power transmission device 41C employs a configuration in which shield member 103 is connected to the end of power transmission-side shield 102 on the side where power reception unit 27 is provided, and this shield member 103 is gradually inclined in the direction opposite to the end. This configuration can also achieve the functions and effects similar to those achieved in power transmission devices 41, 41A and 41B.

Figure 15:
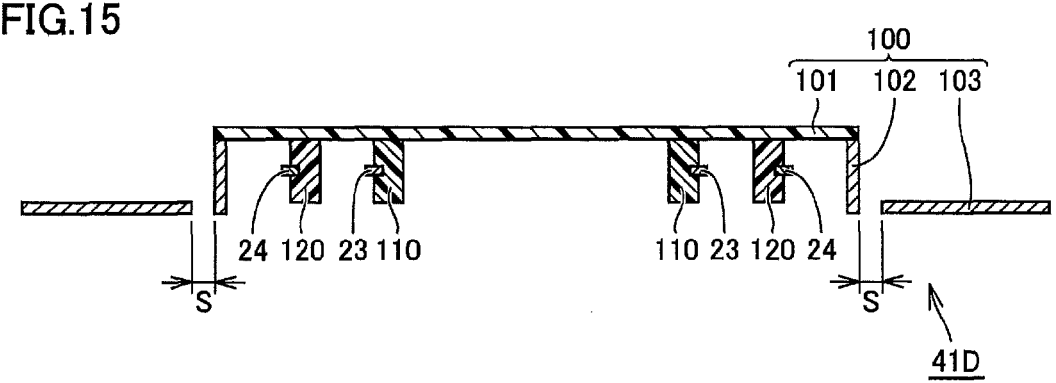
FIG. 15 is a cross-sectional view of a power transmission device according to still another embodiment taken along the line IX-IX in FIG. 7.

Referring to FIG. 15, this power transmission device 41D is configured such that shield member 103 is not in contact with power transmission-side shield 102, and disposed in a position spaced apart at a prescribed distance (S) from the outer surface of power transmission-side shield 102. Prescribed distance (S) is set in accordance with the frequency of the electromagnetic waves to be leaked.

Figure 16:
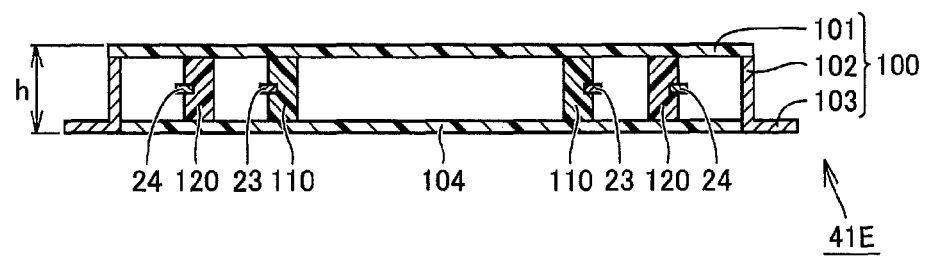
FIG. 16 is a cross-sectional view of a power transmission device according to still another embodiment taken along the line IX-IX in FIG. 7.
Figure 17:
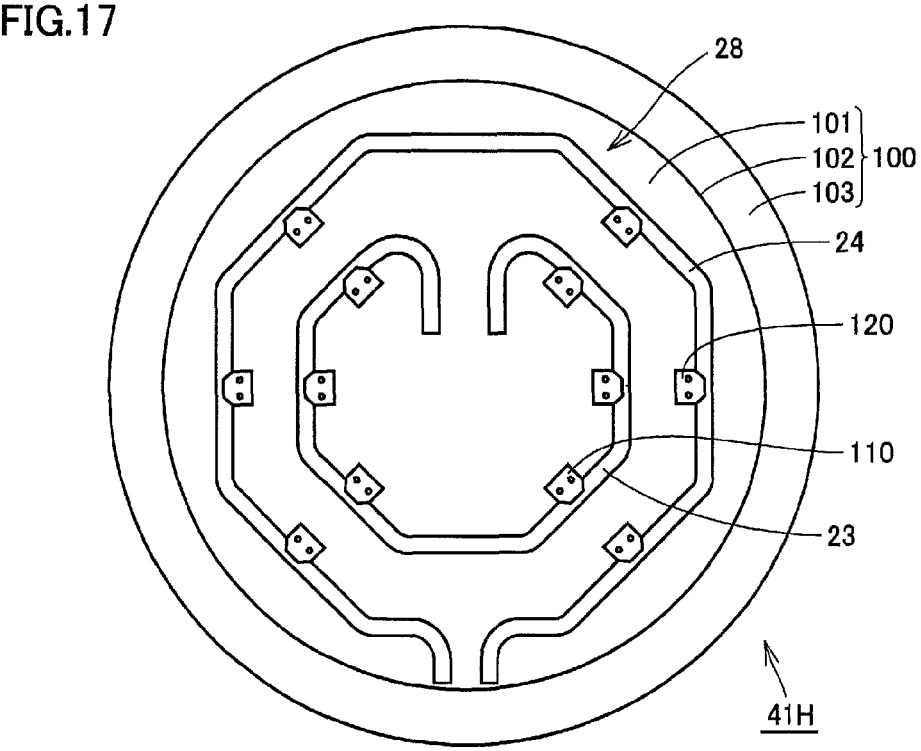
FIG. 17 is a cross-sectional view of a power transmission device according to still another embodiment taken along the line IX-IX in FIG. 7.

In the above-described embodiment, passage of the electromagnetic waves is allowed by the configuration in which no element is provided in a region on the side opposite to the region where power reception unit 27 is located across power transmission-side shield 102. As in the case of the above-described cover 101, it is also possible to employ the configuration in which cover 104 not having an electromagnetic wave screening effect is used to block the opening on the bottom side, as shown in power transmission device 41E in FIG. 16.

Furthermore, although it has been described in the above embodiment that circular electromagnetic induction coil 23 and circular resonant coil 24 are employed, the shape of each coil is not limited to a circle. For example, as in a power transmission device 41H shown in FIG. 17, it is also possible to employ electromagnetic induction coil 23 and resonant coil 24 each having an octagonal coil shape. Furthermore, it is also possible to employ a coil in a rectangular shape or in other polygonal shape.

Also when a polygonal coil is employed in this way, power transmission-side shield 102 is provided with shield member 103 on the side opposite to power transmission unit 28 across power transmission-side shield 102, as in the above-described embodiment.

Figure 18:
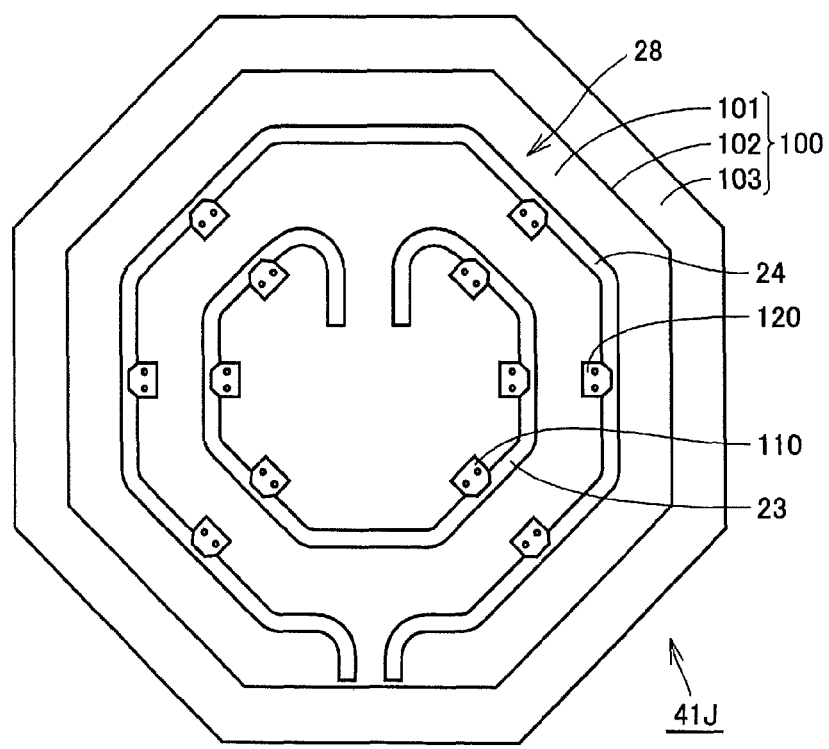
FIG. 18 is a cross-sectional view of a power transmission device according to still another embodiment taken along the line IX-IX in FIG. 7.

Furthermore, the shape of power transmission-side shield 102 forming shield cover 100 is not limited to a cylindrical shape, but cover 101, power transmission-side shield 102 and shield member 103 each can be formed, for example, in an octagonal shape in accordance with the shapes of electromagnetic induction coil 23 and resonant coil 24 each having an octagonal coil shape, as in a power transmission device 41J shown in FIG. 18.

Power transmission-side shield 102 formed in a hollow shape is not limited to the above-mentioned cylindrical shape or octagonal shape, but means a shape that surrounds power transmission unit 28 in the coaxial circumferential direction and is not blocked in the axial direction based on the axis extending along the straight direction connecting power transmission unit 28 and power reception unit 27 during contactless charging in the state where power transmission unit 28 and power reception unit 27 are usually used.

Figure 19:
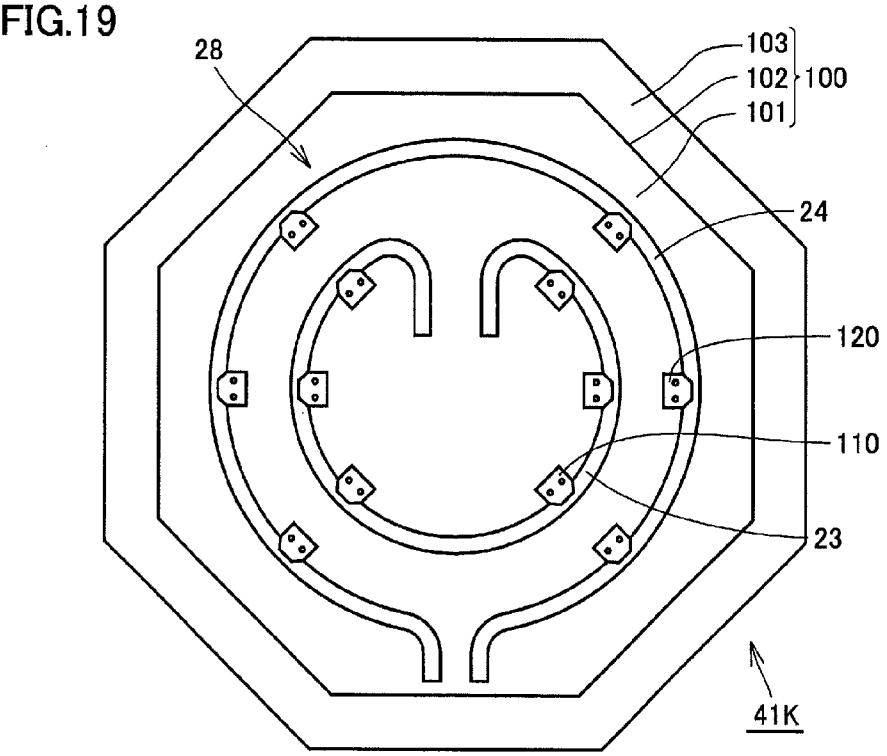
FIG. 19 is a bottom view of a power transmission device according to still another embodiment.
Figure 20:
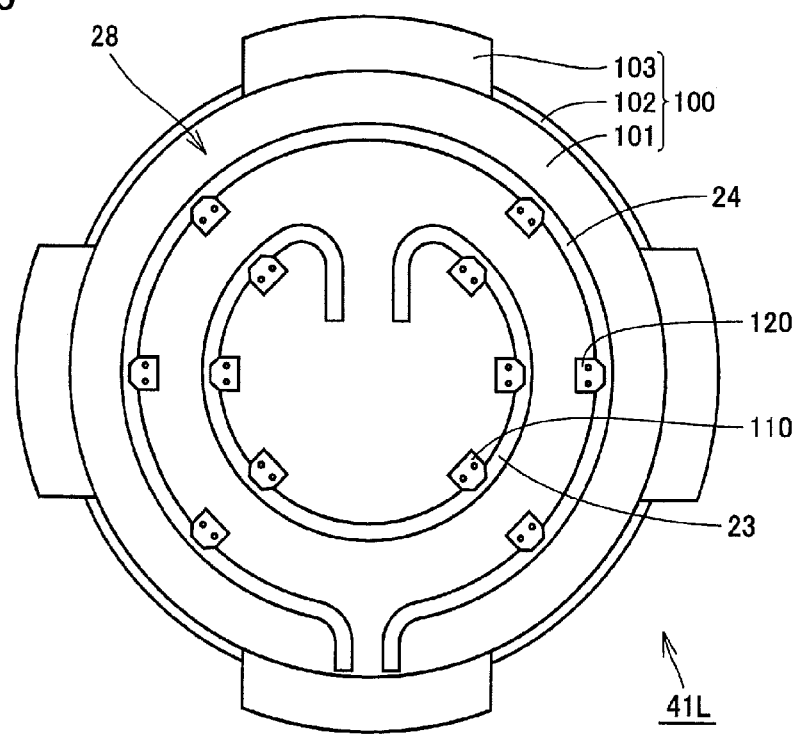
FIG. 20 is a bottom view of a power transmission device according to still another embodiment.

Furthermore, as in a power transmission device 41K shown in FIG. 19, electromagnetic induction coil 23 and resonant coil 24 each can be formed in a circular shape while cover 101, power transmission-side shield 102 and shield member 103 each can be formed in an octagonal (polygonal) shape, but opposite combination of the shapes (as in power transmission device 41H shown in FIG. 17) can also be possible.

Furthermore, it has been described that shield member 103 is provided so as to surround the entire circumference of power transmission-side shield 102. However, in the case where leakage of the electromagnetic waves to the radially outside of power transmission-side shield 102 only has to be partially suppressed, it is also possible to employ a configuration in which divided shield members 103 are provided in required regions, as in a power transmission device 41L shown in FIG. 20.

Furthermore, the configuration on the power transmission device side, which has been described in each of the above-described embodiments, can also be applied similarly to a power reception device. For example, FIG. 21 shows a power reception device 40A in the case where the structure shown in FIG. 9 is applied on the power reception device side.

Figure 21:
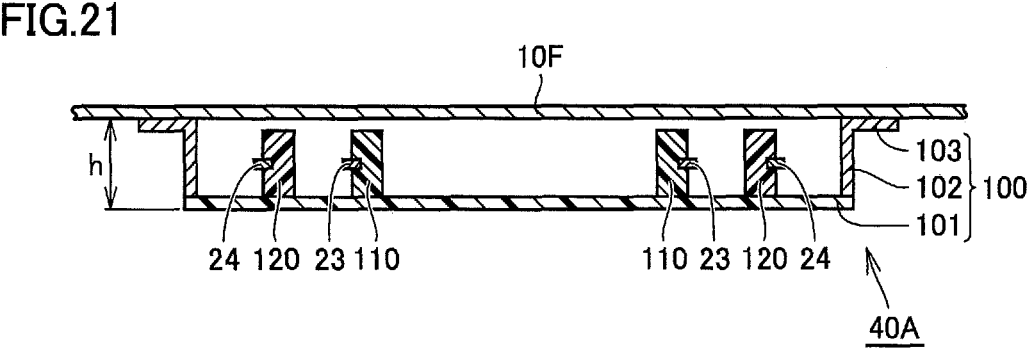
FIG. 21 is a cross-sectional view showing the structure of a power reception device according to another embodiment.

Referring to FIG. 21, as power transmission-side shield 102 is read as power reception-side shield 102, for example, power reception device 40A can be installed on the underside of a floor panel 10F of the vehicle. The configuration of the power transmission device shown in each of FIGS. 12 to 20 can be applied also on the power reception device side.

Therefore, also on the power reception device side as well as on the power transmission device side, it becomes possible to employ a structure in which electromagnetic waves can pass through a region on the side opposite to the region where power transmission unit 28 is located across power reception-side shield 102; and a structure in which power reception-side shield 102 is provided on its outer circumferential surface side with shield member 103 extending outwardly.

Although the power transmission device and the power reception device including electromagnetic induction coils as coil 23 and coil 12, respectively, have been illustrated in the above-described embodiments, the present invention is applicable also to a resonance-type contactless power transmission and reception device not including an electromagnetic induction coil.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 10 electrically powered vehicle, 11, 12, 23, 24 coil, 13 rectifier, 14 DC/DC converter, 15 battery, 16 power control unit, 17 motor unit, 18 vehicle ECU, 19, 25 capacitor, 20 external power feeding device, 21 AC power supply, 22 high-frequency power driver, 26 control unit, 27 power reception unit, 28 power transmission unit, 29 impedance regulator, 40, 40A power reception device, 41, 41A, 41B, 41C, 41D, 41E, 41H, 41J, 41K, 41L power transmission device, 42 parking space, 100 shield cover, 101 cover, 102 power transmission-side shield, 103 shield member, 110a, 120a support groove, 110, 120 coil support member.

The invention claimed is:

1. A power transmission device comprising:
a power transmission unit transmitting electric power in a contactless manner to a power reception unit provided outside;
a power transmission-side shield formed in a hollow shape and provided so as to surround said power transmission unit, the power transmission-side shield defining a first opening on a first side of the power transmission-side shield facing the power reception unit and a second opening on a second side of the power transmission-side shield opposite the first side,
a cover disposed on the first side of the power transmission-side shield to cover the first opening, the cover being formed of a material without an electromagnetic wave screening effect to permit an electromagnetic wave generated by the power transmission unit to pass through the first opening and the cover, and
a shield member extending outwardly in a radial direction of the hollow shape of the power transmission-side shield,
the power transmission device being configured to permit an electromagnetic wave generated by the power transmission unit to pass through the second opening and
said power transmission-side shield being provided on an outer circumferential surface side thereof with the shield member.

2. The power transmission device according to claim 1, wherein said shield member is electrically connected to said power transmission-side shield.

3. The power transmission device according to claim 2, wherein said shield member is electrically connected to an end of said power transmission-side shield on the second side of the power transmission-side shield.

4. The power transmission device according to claim 1, wherein a difference between a natural frequency of said power transmission unit and a natural frequency of said power reception unit is equal to or less than 10% of the natural frequency of said power reception unit.

5. The power transmission device according to claim 1, wherein a coupling coefficient between said power reception unit and said power transmission unit is equal to or less than 0.1.

6. The power transmission device according to claim 1, wherein said power transmission unit transmits electric power to said power reception unit through at least one of a magnetic field formed between said power reception unit and said power transmission unit and oscillating at a specific frequency, and an electric field formed between said power reception unit and said power transmission unit and oscillating at a specific frequency.

7. A power transfer system comprising: a power transmission device including a power transmission unit; and a power reception device including a power reception unit receiving electric power from said power transmission unit in a contactless manner,
said power transmission device including
a power transmission-side shield formed in a hollow shape and provided so as to surround said power transmission unit the power transmission-side shield defining a first opening on a first side of the power transmission-side shield facing the power reception unit and a second opening on a second side of the power transmission-side shield opposite the first side, and
a cover disposed on the first side of the power transmission-side shield to cover the first opening, the cover being formed of a material without an electromagnetic wave screening effect to permit an electromagnetic wave generated by the power transmission unit to pass through the first opening and the cover, and
a shield member extending outwardly in a radial direction of the hollow shape of the power transmission-side shield and
said power transmission device being configured such that an electromagnetic wave generated by the power transmission unit is permitted to pass through the second opening, and
said power transmission-side shield is provided on an outer circumferential surface side thereof with the shield member.

8. The power transfer system according to claim 7, wherein said shield member is electrically connected to said power transmission-side shield.

9. The power transfer system according to claim 8, wherein said shield member is electrically connected to an end of said power transmission-side shield on the second side of the power transmission-side shield.

10. A power reception device comprising:
a power reception unit receiving electric power in a contactless manner from a power transmission unit provided outside;
a power reception-side shield formed in a hollow shape and provided so as to surround said power reception unit, the power reception-side shield defining a first opening on a first side of the power reception-side shield facing the power transmission unit and a second opening on a second side of the power reception-side shield opposite the first side,
a cover disposed on the first side of the power reception-side shield to cover the first opening the cover being formed of a material without an electromagnetic wave screening effect to permit an electromagnetic wave generated by the power transmission unit to pass through the first opening and the cover, and
a shield member extending outwardly in a radial direction of the hollow shape of the power reception-side shield,
the power reception device being configured to permit an electromagnetic wave generated by the power transmission unit to pass through the second opening, and
said power reception-side shield being provided on an outer circumferential surface side thereof with the shield member.

11. The power reception device according to claim 10, wherein said shield member is electrically connected to said power reception-side shield.

12. The power reception device according to claim 11, wherein said shield member is electrically connected to an end of said power reception-side shield on the second side of the power reception-side shield.

13. The power reception device according to claim 10, wherein a difference between a natural frequency of said power transmission unit and a natural frequency of said power reception unit is equal to or less than 10% of the natural frequency of said power reception unit.

14. The power reception device according to claim 10, wherein a coupling coefficient between said power reception unit and said power transmission unit is equal to or less than 0.1.

15. The power reception device according to claim 10, wherein said power reception unit receives electric power from said power transmission unit through at least one of a magnetic field formed between said power reception unit and said power transmission unit and oscillating at a specific frequency, and an electric field formed between said power reception unit and said power transmission unit and oscillating at a specific frequency.

16. A power transfer system comprising: a power transmission device including a power transmission unit; and a power reception device including a power reception unit receiving electric power from said power transmission unit in a contactless manner, said power reception device including
- a power reception-side shield formed in a hollow shape and provided so as to surround said power reception unit, the power reception-side shield defining a first opening on a first side of the power reception-side shield facing the power transmission unit and a second opening on a second side of the power reception-side shield opposite the first side,
- a cover disposed on the first side of the power reception-side shield to cover the first opening the cover being formed of a material without an electromagnetic wave screening effect to permit an electromagnetic wave generated by the power transmission unit to pass through the first opening and the cover, and
- a shield member extending outwardly in a radial direction of the hollow shape of the power reception-side shield, and said power reception device being configured such that
- an electromagnetic wave is permitted to pass through the second opening, and
- said power reception-side shield is provided on an outer circumferential surface side thereof with the shield member.

17. The power transfer system according to claim 16, wherein said shield member is electrically connected to said power reception-side shield.

18. The power transfer system according to claim 17, wherein said shield member is electrically connected to an end of said power reception-side shield on the second side of the power reception-side shield.

\* \* \* \* \*